Figure 9:
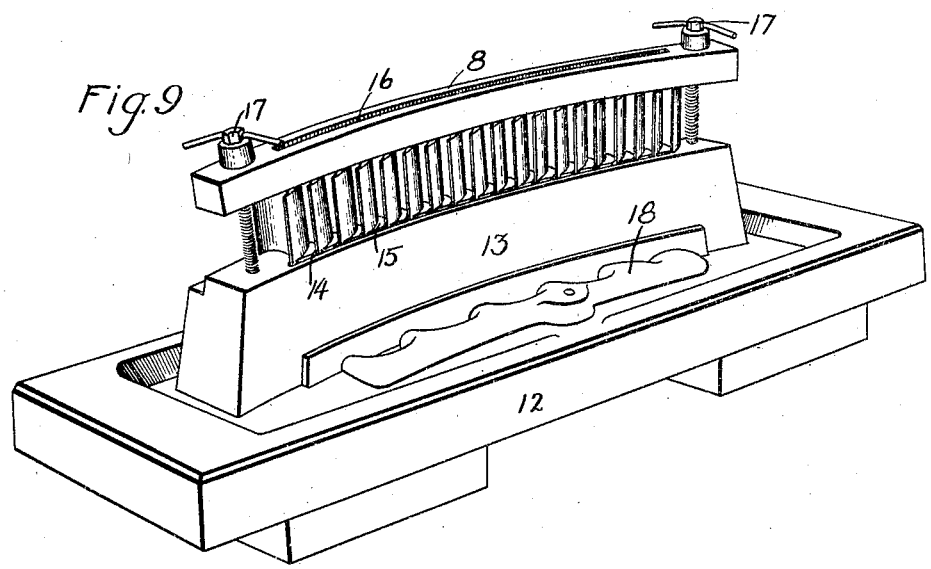

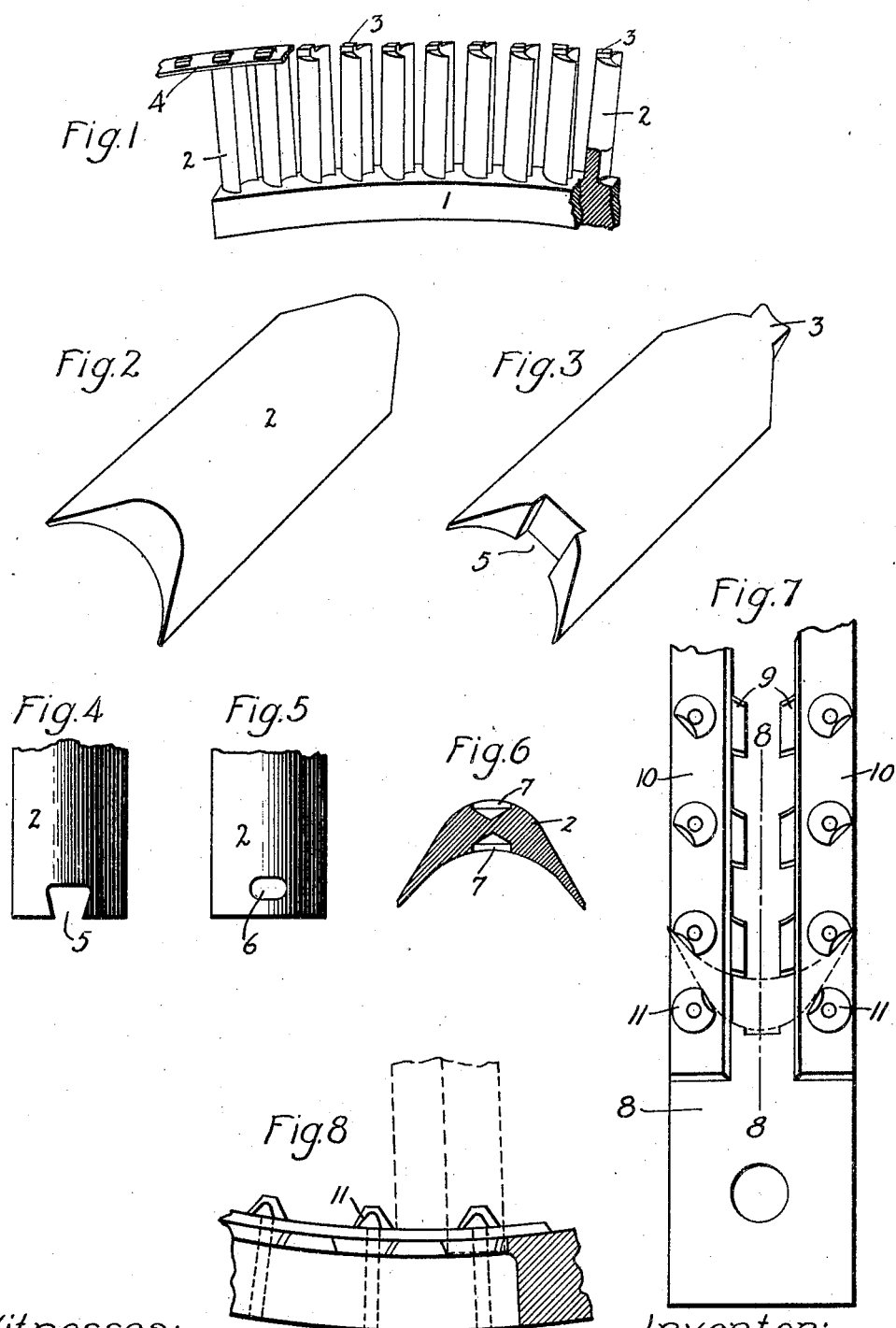

E. H. FARQUHAR.
APPARATUS FOR MANUFACTURING TURBINE BUCKETS.
APPLICATION FILED FEB. 11, 1907.

902,526.

Patented Oct. 27, 1908.
2 SHEETS—SHEET 2.

Witnesses:
Margaret E. Woolley
Helen Alford

Inventor:
Edmund H. Farquhar,
By Albert G. Davis
Atty.

UNITED STATES PATENT OFFICE.

EDMUND H. FARQUHAR, OF SCHENECTADY, NEW YORK, ASSIGNOR TO GENERAL ELECTRIC COMPANY, A CORPORATION OF NEW YORK.

APPARATUS FOR MANUFACTURING TURBINE-BUCKETS.

No. 902,526.      Specification of Letters Patent.      Patented Oct. 27, 1908.

Original application filed January 2, 1906, Serial No. 294,182. Divided and this application filed February 11, 1907. Serial No. 356,763.

*To all whom it may concern:*

Be it known that I, EDMUND H. FARQUHAR, a citizen of the United States, residing at Schenectady, county of Schenectady, State of New York, have invented certain new and useful Improvements in Apparatus for Manufacturing Turbine-Buckets, of which the following is a specification.

This application is a division of my application, Serial No. 294,182, of Jan. 2, 1906, and is filed pursuant to a requirement for division made by the United States Patent Office under Rules 41 and 42 of Office Practice.

The object of my invention is to provide improved apparatus for manufacturing turbine buckets by casting separately formed buckets into a base whereby uniform and satisfactory results may be obtained by the class of workmen ordinarily employed in foundries and machine shops.

In the manufacture of buckets for elastic fluid turbines, it is of the utmost importance that the individual buckets shall be firmly secured to their support on account of the great stress to which they are subjected; that the buckets shall be accurately alined at top and bottom; that the inlet and discharge angles shall be in exact accordance with the theoretical values therefor; and that the height, pitch and location of the buckets with respect to the base shall be in exact accordance with those called for by the specifications and drawings.

In carrying out my invention I make the buckets of a suitable alloy that is capable of being readily worked; is capable of receiving a smooth finish on its surface; is sufficiently hard to prevent steam or other motive fluid from cutting it excessively; is non-corrosive and will not rust or be otherwise injured by the motive fluid. Experience has demonstrated that buckets made of a hot rolling alloy possess these qualities. I prefer to make the base with which the buckets are united of an alloy which possesses the necessary strength; is easy to work; will make a good union with the buckets; and may be cast at a relatively moderate temperature. Where the base is made of an alloy having the same or substantially the same characteristics as the bucket material, it will generally be satisfactory.

The bucket stock as it comes from the extruding dies is usually sufficiently close to the required dimensions to be used without further machining except cutting the long bars into bucket lengths, but if necessary to secure the smooth surface and exact dimensions essential to efficient operation, the stock may be passed through swaging dies or dressed by suitable machine operations. When the buckets are to be provided with a cover, the ends are formed into tenons of suitable shape to receive it by milling or in some other manner.

The preferred procedure in a foundry is to pour all metal at a uniform or substantially uniform temperature, and where structures are being made with bucket stock differing considerably in its cross-sectional area, some of the buckets of large cross-section may not be thoroughly united with the cast metal base owing to chilling, while others of smaller cross-section may be injuriously overheated. In this connection it must be borne in mind that if one bucket is not properly united or is in any way injured, the whole bucket segment is discarded. To avoid the above difficulties, and to permit the foundry to use metal at substantially uniform temperature for all buckets without regard to their cross-section, the base ends of the buckets are so formed that they present substantially the same cross-section to the molten metal. The buckets need not in all cases be treated in this manner but if their size and the temperature of the metal require it, the surface of the base of the bucket may be reduced as by cutting a slot or opening of suitable dimensions therein. This slot may be substantially rectangular with parallel walls or may have a dove-tail shape so that there is a mechanical union of the parts in addition to that due to the fusing of the metals.

The molds in which the buckets are cast to the base will now be described. Mounted on the follow-board is a block of suitable shape to serve as a core-print to form a chamber in the mold to receive and position a core which is inserted at a later stage of the operations after the block has been removed. In the top of the block, which is preferably of metal, is a shallow groove to receive the base ends of the individual buckets. Between the buckets and engaging the base and side walls of the groove and also the buckets, are blocks or spacers which determine the proper pitch of the buckets and in addition determine the inlet and discharge angles. A crown is then applied to the upper ends of the buckets, said crown being provided with notches, grooves or other equivalent devices registering with the tenons and preferably though not necessarily having guiding pins or devices serving to direct the tenons into their places. These pins are also desirable because they save time in placing the crown. After placing the crown, the buckets are alined with a gage to insure their occupying the proper position. In the present instance they stand radially. The crown is then clamped in place. The block and crown constitute in effect a frame for holding the buckets, the construction of which can evidently be varied without departing from my invention. Preferably the block is provided with a gate or runner and molding sand is then packed around the block and between the buckets. The drag or nowel is mounted on the follow-board and a certain amount of sand added and rammed. At or about this stage of the operations the crown is removed and the drag or nowel completely filled with sand and rammed. After being suitably surfaced on the top a cover is clamped on and the mold reversed. The follow-board is removed exposing what was the under side of the block and the sand covered with charcoal or other parting medium. The cope is placed in position with means for forming the sprue and one or more risers where such devices are necessary. The cope is filled with sand, rammed and the sprue and risers removed. The cope is lifted off exposing the block and the gate or runner. Then these parts and the spacers are taken out of the mold leaving the ends of the buckets projecting a certain predetermined distance from the sand. The mold is then slicked or otherwise treated to keep it in shape. The completed mold is put in an oven and baked for a suitable length of time to dry it out and make it hard enough to insure a good casting without cutting. The core is then inserted, the cope replaced and the mold is ready for pouring. Metal at the proper temperature is poured into the mold and fuses with the bucket bases so that the whole becomes an integral mass which solidifies on cooling. After removing the casting, the gate and sprue are cut off, the casting dressed to the proper dimensions and provided with one or more bolt-holes where needed to secure it to a wheel or other support. If desired, the union of the buckets with the base may be tested before finishing by striking each of the buckets a light blow. The buckets having a defective union with the base will give off a different note from those having a perfect union. If the casting is a little rough at the root of the buckets it may be smoothed by a suitable tool. A cover may then be placed over the ends of the buckets and secured by riveting over the tenons.

Figure 10:
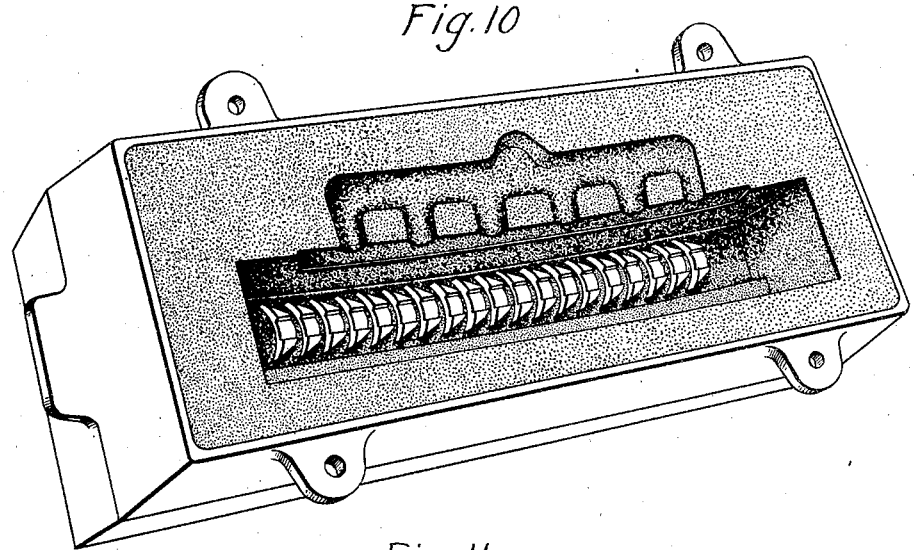
Figure 11:
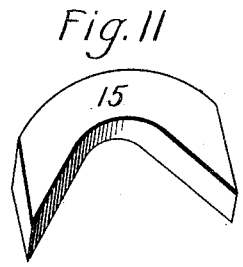

In the accompanying drawings which illustrate one embodiment of my invention, Figure 1 is a perspective view of a bucket segment with part of the cover broken away; Fig. 2 is a perspective view of a section of the bucket stock as received from the extruding dies; Fig. 3 is a perspective view of the bucket ready for insertion in the mold; Figs. 4, 5 and 6 show different forms of slots or holes in the base ends of the buckets; Fig. 7 is an inverted plan view of the crown used to hold the outer ends of the buckets while in the mold; Fig. 8 is a section on line 8—8 of Fig. 7; Fig. 9 is a perspective view of the follow-board with the arc-shaped block mounted thereon; Fig. 10 is a perspective view of the drag or nowel after it has been inverted and the follow-board and block removed; and Fig. 11 is a perspective view of one of the spacing devices.

In Fig. 1, 1 indicates the cast metal base and 2 the saparately formed buckets cast into the base to form an integral part thereof. Fig. 2 shows the bucket as received from the dies before it is dressed or cut to the required shape. Fig. 3 shows a bucket after it is dressed and ready for use. On the outer end of the bucket is a tenon 3 for securing the cover 4. The base of the bucket is reduced in cross-section by cutting a slot 5, Fig. 4, or a hole 6, Fig. 5. The slot may have straight sides as in Fig. 3 or be dove-tailed as in Fig. 4, or two oppositely disposed holes 7 may be provided as in Fig. 6.

Fig. 7 shows in inverted plan the crown 8 for holding the upper ends of the buckets. Projections 9 are formed on adjacent surfaces of the longitudinal members 10 and between the projections are slots or grooves to receive the tenons and hold the buckets. Each longitudinal member is provided with a row of tapered pins 11 which, when the crown is in place, engage the ends of the buckets and direct the tenons into the spaces between the projections.

In Fig. 9, 12 indicates the follow-board and 13 the block containing a shallow groove 14 on its upper face to receive the buckets 2 and the removable spacers 15. The crown 8 is provided with a longitudinal slot 16 through which the tenons on the buckets can be seen. The crown is held in place by clamps 17 that enter the block 13.

18 indicates the gate or runner which may be attached to the block or be separable therefrom.

Fig. 10 shows the drag with the cope removed and the base ends of the buckets projecting from the sand. In the illustration, the block and crown are segments of circles of different diameters but they may be made straight and bent afterwards if desired, although this method is not so satisfactory because it necessitates an additional operation.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A means for casting separately formed turbine buckets to a segmental supporting base, comprising a flask, and a holder which holds the buckets in place while the sand is being rammed in the flask and is removed before the metal is poured, said holder including an arc-shaped segmental block with which the buckets engage at one end, spacing means carried by the block for separating the buckets by the desired pitch distance, a crown which engages the opposite ends of the buckets to maintain them in radial relation to the segmental block, and devices for clamping the buckets between the crown and the block.

2. A means for casting separately formed buckets to a supporting base, comprising a flask, and a holder for alining the individual buckets in the flask while the sand is being rammed, said holder including a block with which the buckets engage at one end, spacing means carried by the block for separating the buckets by the desired pitch distance, a crown engaging the opposite ends of the buckets to preserve the alinement, and means for clamping the buckets between the crown and the block.

3. A means for casting separately formed buckets to a supporting base, comprising a flask, a means for temporarily holding the buckets in the flask while the sand is being rammed, comprising a block having a shallow groove to receive the ends of the buckets, removable spacers located in the groove between the buckets, and a crown engaging the opposite ends of the buckets to preserve the alinement, and devices for clamping the buckets between the crown and the block.

4. A means for casting separately formed buckets to a supporting base, comprising a flask, and a holder for alining the individual buckets in the flask while the sand is being rammed, said holder including a block with which the buckets engage at one end, and spacing means for separating the buckets by the desired pitch distance, the block also forming a print for the core which determined the thickness of the base.

In witness whereof, I have hereunto set my hand this 8th day of February, 1907.

EDMUND H. FARQUHAR.

Witnesses:
HELEN ORFORD,
MARGARET E. WOOLLEY.